United States Patent
Cho et al.

(10) Patent No.: US 9,618,089 B2
(45) Date of Patent: Apr. 11, 2017

(54) PLANETARY GEAR TRAIN OF AUTOMATIC TRANSMISSION FOR VEHICLE

(71) Applicant: Hyundai Motor Company, Seoul (KR)

(72) Inventors: Wonmin Cho, Hwaseong-si (KR); Jae Chang Kook, Hwaseong-si (KR); Myeong Hoon Noh, Seongnam-si (KR); Seongwook Ji, Ansan-si (KR); Kangsoo Seo, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 64 days.

(21) Appl. No.: 14/825,951

(22) Filed: Aug. 13, 2015

(65) Prior Publication Data

US 2016/0169336 A1    Jun. 16, 2016

(30) Foreign Application Priority Data

Dec. 10, 2014 (KR) .......... 10-2014-0177366

(51) Int. Cl.
  *F16H 3/62* (2006.01)
  *F16H 3/44* (2006.01)
  *F16H 3/66* (2006.01)

(52) U.S. Cl.
  CPC ....... *F16H 3/66* (2013.01); *F16H 2200/0078* (2013.01); *F16H 2200/2012* (2013.01); *F16H 2200/2046* (2013.01)

(58) Field of Classification Search
  CPC ............. F16H 2200/2012; F16H 2200/2046
  See application file for complete search history.

(56) References Cited

U.S. PATENT DOCUMENTS

| | | | |
|---|---|---|---|
| 5,133,697 A * | 7/1992 | Hattori | F16H 3/663 475/276 |
| 2013/0274059 A1 | 10/2013 | Beck et al. | |
| 2016/0230849 A1 * | 8/2016 | Haupt | F16H 3/66 |
| 2016/0333969 A1 * | 11/2016 | Kook | F16H 3/66 |

FOREIGN PATENT DOCUMENTS

| | | |
|---|---|---|
| JP | 2014-500462 A | 1/2014 |
| KR | 10-2012-0132021 A | 12/2012 |
| KR | 10-2013-0013251 A | 2/2013 |

* cited by examiner

*Primary Examiner* — Tisha Lewis
(74) *Attorney, Agent, or Firm* — Morgan, Lewis & Bockius LLP

(57) ABSTRACT

A planetary gear train of an automatic transmission of a vehicle may include an input shaft receiving torque of an engine, an output shaft outputting changed torque, a first planetary gear set including a first sun gear, a first planet carrier, and a first ring gear, a second planetary gear set including a second sun gear, a second planet carrier, and a second ring gear, a third planetary gear set including a third sun gear, a third planet carrier, and a third ring gear, a fourth planetary gear set including a fourth sun gear, a fourth planet carrier, and a fourth ring gear, a first rotation shaft, a second rotation shaft, a third rotation shaft, a fourth rotation shaft, a fifth rotation shaft, a sixth rotation shaft, a seventh rotation shaft, and an eighth rotation shaft.

10 Claims, 2 Drawing Sheets

FIG. 2

|  | C1 | C2 | C3 | B1 | B2 | B3 | GEAR RATIO |
|---|---|---|---|---|---|---|---|
| 1ST |  |  | O | O | O |  | 9.870 |
| 2ND |  | O |  | O | O |  | 2.100 |
| 3RD |  | O | O |  | O |  | 1.800 |
| 4TH |  | O |  |  | O | O | 1.719 |
| 5TH | O | O |  |  | O |  | 1.615 |
| 6TH | O |  |  |  | O | O | 1.270 |
| 7TH | O |  | O |  | O |  | 1.088 |
| 8TH | O | O | O |  |  |  | 1.000 |
| 9TH | O |  | O | O |  |  | 0.961 |
| 10TH | O | O |  | O |  |  | 0.840 |
| 11TH |  | O | O | O |  |  | 0.600 |
| 12TH |  | O |  | O |  | O | 0.195 |
| REV |  |  | O | O |  | O | 1.905 |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2014-0177366 filed Dec. 10, 2014, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission of a vehicle which improves power delivery performance and reduces fuel consumption by achieving twelve forward speed stages using a minimum number of constituent elements.

Description of Related Art

In recent years, a rise in oil price causes dashing into unlimited competition for enhancing fuel efficiency.

As a result, research into reduction of weight and the enhancement of fuel efficiency through down-sizing is conducted in the case of an engine and research for simultaneously securing operability and fuel efficiency competitiveness through multiple speed stages is conducted in the case of an automatic transmission.

However, in the automatic transmission, as the number of speed stages increase, the number of internal components increase, and as a result, mountability, transmission efficiency, and the like may still deteriorate, and cost and weight may increase.

Accordingly, development of a planetary gear train which may bring about maximum efficiency with a small number of components may be important in order to increase a fuel efficiency enhancement effect through the multi-stages.

In this aspect, in recent years, 8 and 9-speed automatic transmissions tend to be implemented and the research and development of a planetary gear train capable of implementing more speed stages has also been actively conducted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission of a vehicle having advantages of improving power delivery performance and fuel economy by achieving twelve forward speed stages and one reverse speed stage using minimum number of constituent elements and of improving silent driving using a driving point positioned at a low engine speed.

According to various aspects of the present invention, a planetary gear train of an automatic transmission of a vehicle may include an input shaft receiving torque of an engine, an output shaft outputting changed torque, a first planetary gear set including a first sun gear, a first planet carrier, and a first ring gear, a second planetary gear set including a second sun gear, a second planet carrier, and a second ring gear, a third planetary gear set including a third sun gear, a third planet carrier, and a third ring gear, a fourth planetary gear set including a fourth sun gear, a fourth planet carrier, and a fourth ring gear, a first rotation shaft including the first and second sun gears and selectively connected to a transmission housing, a second rotation shaft including the first planet carrier and the third and fourth ring gears, a third rotation shaft including the first ring gear and selectively connected to the transmission housing, a fourth rotation shaft including the second planet carrier, directly connected to the input shaft, and selectively connected to the second rotation shaft, a fifth rotation shaft including the second ring gear and the third sun gear, a sixth rotation shaft including the third planet carrier, a seventh rotation shaft including the fourth sun gear and selectively connected to the sixth rotation shaft or the transmission housing, and an eighth rotation shaft including the fourth planet carrier, directly connected to the output shaft, and selectively connected to the sixth rotation shaft.

Each of the first, second, third, and fourth planetary gear sets may be a single pinion planetary gear set.

The first, second, third, and fourth planetary gear sets may be disposed sequentially from an engine side.

The planetary gear train may further include a first clutch disposed between the second rotation shaft and the fourth rotation shaft, a second clutch disposed between the sixth rotation shaft and the eighth rotation shaft, a third clutch disposed between the sixth rotation shaft and the seventh rotation shaft, a first brake disposed between the first rotation shaft and the transmission housing, a second brake disposed between the third rotation shaft and the transmission housing, and a third brake disposed between the seventh rotation shaft and the transmission housing.

A first forward speed stage may be achieved by operation of the third clutch and the first and second brakes, a second forward speed stage may be achieved by operation of the second clutch and the first and second brakes, a third forward speed stage may be achieved by operation of the second and third clutches and the second brake, a fourth forward speed stage may be achieved by operation of the second clutch and the second and third brakes, a fifth forward speed stage may be achieved by operation of the first and second clutches and the second brake, a sixth forward speed stage may be achieved by operation of the first clutch and the second and third brakes, a seventh forward speed stage may be achieved by operation of the first and third clutches and the second brake, an eighth forward speed stage may be achieved by operation of the first, second, and third clutches, a ninth forward speed stage may be achieved by operation of the first and third clutches and the first brake, a tenth forward speed stage may be achieved by operation of the first and second clutches and the first brake, an eleventh forward speed stage may be achieved by operation of the second and third clutches and the first brake, a twelfth forward speed stage may be achieved by operation of the second clutch and the first and third brakes, and a reverse speed stage may be achieved by operation of the third clutch and the first and third brakes.

According to various aspects of the present invention, a planetary gear train of an automatic transmission for a vehicle may include an input shaft receiving torque of an engine, an output shaft outputting changed torque, a first planetary gear set including a first sun gear, a first planet carrier, and a first ring gear, a second planetary gear set including a second sun gear, a second planet carrier, and a second ring gear, a third planetary gear set including a third sun gear, a third planet carrier, and a third ring gear, and a fourth planetary gear set including a fourth sun gear, a fourth planet carrier, and a fourth ring gear, in which the input shaft may be directly connected to the second planet carrier, the output shaft may be directly connected to the fourth planet carrier, the first sun gear may be directly connected to the second sun gear, the first planet carrier may be directly connected to the third ring gear and the fourth ring gear, the second ring gear may be directly connected to the third sun gear, the first planet carrier may be selectively connected to the second planet carrier, the third planet carrier may be selectively connected to the fourth planet carrier, the third planet carrier may be selectively connected to the fourth sun gear, the first sun gear and the second sun gear may be selectively connected to a transmission housing, the first ring gear may be selectively connected to the transmission housing, and the fourth sun gear may be selectively connected to the transmission housing.

The planetary gear train may further include a first clutch selectively connecting the first planet carrier to the second planet carrier, a second clutch selectively connecting the third planet carrier to the fourth planet carrier, a third clutch selectively connecting the third planet carrier to the fourth sun gear, a first brake selectively connecting the first sun gear and the second sun gear to the transmission housing, a second brake selectively connecting the first ring gear to the transmission housing, and a third brake selectively connecting the fourth sun gear to the transmission housing.

Various embodiments of the present invention may achieve twelve forward speed stages by combining four planetary gear sets with six friction elements. Therefore, power delivery performance and fuel economy may be improved.

Since a speed stage suitable to engine speed can be achieved due to multiple speed stages, silent driving may be improved.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of friction elements at each speed in the exemplary planetary gear train according to the present invention.

Figure 1:
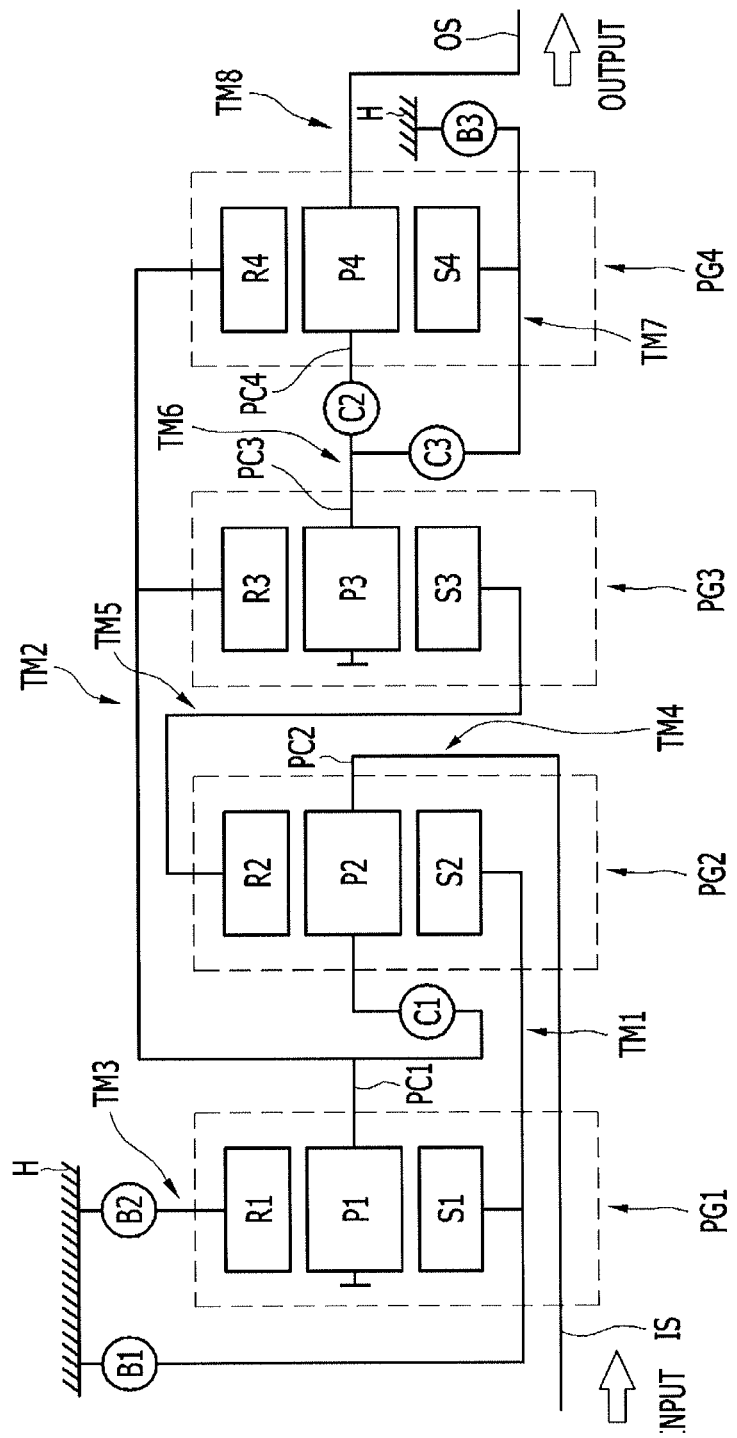
FIG. 1 is a schematic diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic diagram of a planetary gear train according to various embodiments of the present invention.

Referring to FIG. 1, a planetary gear train according to various embodiments of the present invention includes first, second, third, and fourth planetary gear sets PG1, PG2, PG3, and PG4 disposed on the same axis, and input shaft IS, an output shaft OS, eight rotation shafts TM1 to TM8 including at least one of rotation elements of the first, second, third, and fourth planetary gear sets PG1, PG2, PG3, and PG4, six friction elements C1 to C3 and B11 to B3, and a transmission housing H.

As a result, torque input from the input shaft IS is changed by cooperation of the first, second, third, and fourth planetary gear sets PG1, PG2, PG3, and PG4, and the changed torque is output through the output shaft OS.

The simple planetary gear sets are disposed in a sequence of the first, second, third, and fourth planetary gear sets PG1, PG2, PG3, and PG4 from an engine side.

The input shaft IS is an input member and power from a crankshaft of an engine is torque-converted through a torque converter to be input into the input shaft IS.

The output shaft OS is an output member, is disposed in parallel with the input shaft IS, and transmits driving torque to a driving wheel through a differential apparatus.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 as rotation elements thereof The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 as rotation elements thereof The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 as rotation elements thereof.

The fourth planetary gear set PG4 is a single pinion planetary gear set and includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4 as rotation elements thereof.

In the first, second, third, and fourth planetary gear sets PG1, PG2, PG3, and PG4, one or more rotation elements are directly connected to each other to operate with eight rotation shafts TM1 to TM8.

The eight rotation shafts TM1 to TM8 will be described in further detail.

The first rotation shaft TM1 includes the first and second sun gears Si and S2 and is selectively connected to the transmission housing H so as to be operated as a selective fixed element.

The second rotation shaft TM2 includes the first planet carrier PC1 and the third and fourth ring gears R3 and R4.

The third rotation shaft TM3 includes the first ring gear R1 and is selectively connected to the transmission housing H so as to be operated as a selective fixed element.

The fourth rotation shaft TM4 includes the second planet carrier PC2, is selectively connected to the second rotation shaft TM2, and is directly connected to the input shaft IS so as to be continuously operated as an input element.

The fifth rotation shaft TM5 includes the second ring gear R2 and the third sun gear S3.

The sixth rotation shaft TM6 includes the third planet carrier PC3.

The seventh rotation shaft TM7 includes the fourth sun gear S4 and is selectively connected to the sixth rotation shaft TM6 or the transmission housing H.

The eighth rotation shaft TM8 includes the fourth planet carrier PC4, is selectively connected to the sixth rotation shaft TM6, and is directly connected to the output shaft OS so as to be continuously operated as an output element.

In addition, three clutches C1, C2, and C3 which are friction elements are disposed at connection portions between the input shaft IS and any one rotation shaft or between any two rotation shafts.

In addition, three brakes B1, B2, and B3 which are friction elements are disposed at connection portions between any one rotation shaft and the transmission housing H.

The six friction elements C1 to C3 and B1 to B3 will be described in further detail.

The first clutch C1 is interposed between the second rotation shaft TM2 and the fourth rotation shaft TM4 and selectively connects the second rotation shaft TM2 to the fourth rotation shaft TM4.

The second clutch C2 is interposed between the sixth rotation shaft TM6 and the eighth rotation shaft TM8 and selectively connects the sixth rotation shaft TM6 to the eighth rotation shaft TM8.

The third clutch C3 is interposed between the sixth rotation shaft TM6 and the seventh rotation shaft TM7 and selectively connects the sixth rotation shaft TM6 to the seventh rotation shaft TM7.

The first brake B1 is interposed between the first rotation shaft TM1 and the transmission housing H and causes the first rotation shaft TM1 to be operated as a selective fixed element.

The second brake B2 is interposed between the third rotation shaft TM3 and the transmission housing H and causes the third rotation shaft TM3 to be operated as a selective fixed element.

The third brake B3 is interposed between the seventh rotation shaft TM7 and the transmission housing H and causes the seventh rotation shaft TM7 to be operated as a selective fixed element.

Therefore, the first and second planetary gear sets PG1 and PG2 operate as a compound planetary gear set when the first clutch C1 is operated, and the third and fourth planetary gear sets PG3 and PG4 operate as a compound planetary gear set when the second clutch C2 or the third clutch C3 is operated.

The friction elements including the first, second, and third clutches C1, C2, and C3 and the first, second, and third brakes B1, B2, and B3 may be multi-plates friction elements of wet type that are operated by hydraulic pressure.

FIG. 2 is an operation chart of friction elements at each speed in the planetary gear train according to various embodiments of the present invention.

As shown in FIG. 2, three friction elements are operated at each speed stage in the planetary gear train according to various embodiments of the present invention.

The first and second brakes B1 and B2 and the third clutch C3 are operated at a first forward speed stage 1ST.

In a state that all the rotation elements of the first planetary gear set PG1 are stopped by operation of the first and second brakes B1 and B2 and rotation speed of the input shaft IS is input to the fourth rotation shaft TM4, the first rotation shaft TM1 is operated as the fixed element by operation of the first brake B1. Therefore, increased rotation speed is output through the fifth rotation shaft TM5 of the second planetary gear set PG2.

In addition, the third and fourth planetary gear sets PG3 and PG4 operate as the compound planetary gear set by operation of the third clutch C3, the increased rotation speed is input to the fifth rotation shaft TM5, and the second rotation shaft TM2 is operated as the fixed element. Therefore, the first forward speed stage is achieved.

The first and second brakes B1 and B2 and the second clutch C2 are operated at a second forward speed stage 2ND.

In a state that all the rotation elements of the first planetary gear set PG1 are stopped by operation of the first and second brakes B1 and B2 and rotation speed of the input shaft IS is input to the fourth rotation shaft TM4, the first rotation shaft TM1 is operated as the fixed element by operation of the first brake B1. Therefore, increased rotation speed is output through the fifth rotation shaft TM5 of the second planetary gear set PG2.

In addition, the third and fourth planetary gear sets PG3 and PG4 operate as the compound planetary gear set by operation of the second clutch C2, the increased rotation speed is input to the fifth rotation shaft TM5, and the second rotation shaft TM2 is operated as the fixed element. Therefore, the second forward speed stage is achieved.

Since a gear ratio of the compound planetary gear set when the second clutch C2 is operated is smaller than that of the compound planetary gear set when the third clutch C3 is operated, a shift between the first forward speed stage and the second forward speed stage is possible.

The second and third clutches C2 and C3 and the second brake B2 are operated at a third forward speed stage 3RD.

In a state that rotation speed of the input shaft IS is input to the fourth rotation shaft TM4, the third rotation shaft TM3 is operated as the fixed element by operation of the second brake B2. Therefore, reduced rotation speed is output through the fifth rotation shaft TM5 in the first and second planetary gear sets PG1 and PG2.

In addition, the third and fourth planetary gear sets PG3 and PG4 become direct-coupling states by operation of the second and third clutches C2 and C3. Therefore, the reduced rotation speed input through the fifth rotation shaft TM5 is just output and the third forward speed stage is achieved.

The second clutch C2 and the second and third brakes B2 and B3 are operated at a fourth forward speed stage 4TH.

In a state that rotation speed of the input shaft IS is input to the fourth rotation shaft TM4, the third rotation shaft TM3 is operated as the fixed element by operation of the second brake B2. Therefore, reduced rotation speed is output through the fifth rotation shaft TM5 in the first and second planetary gear sets PG1 and PG2.

In addition, the third and fourth planetary gear sets PG3 and PG4 operate as the compound planetary gear set by operation of the second clutch C2, the reduced rotation speed is input to the fifth rotation shaft TM5, and the seventh rotation shaft TM7 is operated as the fixed element by operation of the third brake B3. Therefore, the fourth forward speed stage is achieved.

The first and second clutches C1 and C2 and the second brake B2 are operated at a fifth forward speed stage 5TH.

In a state that the first and second planetary gear sets PG1 and PG2 operate as the compound planetary gear set by operation of the first clutch C1 and rotation speed of the input shaft IS is input to the fourth rotation shaft TM4, the third rotation shaft TM3 is operated as the fixed element by operation of the second brake B2. Rotation speed that is the same as the rotation speed of the input shaft IS is output to the second rotation shaft TM2 and reduced rotation speed is output through the fifth rotation shaft TM5.

In a state that the third and fourth planetary gear sets PG3 and PG4 operate as the compound planetary gear set by operation of the second clutch C2 and the reduced rotation speed is input to the fifth rotation shaft TM5, the rotation speed that is the same as the rotation speed of the input shaft IS is input to the second rotation shaft TM2. Therefore, the fifth forward speed stage is achieved.

The first clutch C1 and the second and third brakes B2 and B3 are operated at a sixth forward speed stage 6TH.

In a state that the first and second planetary gear sets PG1 and PG2 operate as the compound planetary gear set by operation of the first clutch C1 and rotation speed of the input shaft IS is input to the fourth rotation shaft TM4, the third rotation shaft TM3 is operated as the fixed element by operation of the second brake B2. Rotation speed that is the same as the rotation speed of the input shaft IS is output to the second rotation shaft TM2 and reduced rotation speed is output through the fifth rotation shaft TM5.

In a state that the rotation speed that is the same as the rotation speed of the input shaft IS is input to the second rotation shaft TM2, the seventh rotation shaft TM7 is operated as the fixed element by operation of the third brake B3. Therefore, the sixth forward speed stage is achieved.

The first and third clutches C1 and C3 and the second brake B2 are operated at a seventh forward speed stage 7TH.

In a state that the first and second planetary gear sets PG1 and PG2 operate as the compound planetary gear set by operation of the first clutch C1 and rotation speed of the input shaft IS is input to the fourth rotation shaft TM4, the third rotation shaft TM3 is operated as the fixed element by operation of the second brake B2. Rotation speed that is the same as the rotation speed of the input shaft IS is output to the second rotation shaft TM2 and reduced rotation speed is output through the fifth rotation shaft TM5.

In a state that the third and fourth planetary gear sets PG3 and PG4 operate as the compound planetary gear set by operation of the third clutch C3 and the rotation speed that is the same as the rotation speed of the input shaft IS is input to the second rotation shaft TM2, the reduced rotation speed is input to the fifth rotation shaft TM5. Therefore, the seventh forward speed stage is achieved.

The first, second, and third clutches C1, C2, and C3 are operated at an eighth forward speed stage 8TH.

The first and second planetary gear sets PG1 and PG2 operate as the compound planetary gear set by operation of the first clutch C1, and rotation speed of the input shaft IS input to the fourth rotation shaft TM4 is transferred to the second rotation shaft TM2.

In addition, the third and fourth planetary gear sets PG3 and PG4 become direct-coupling states by operation of the second and third clutches C2 and C3, and the eighth forward speed stage where the rotation speed of the input shaft IS input through the second rotation shaft TM2 is just output is achieved.

The first and third clutches C1 and C3 and the first brake B1 are operated at a ninth forward speed stage 9TH.

In a state that the first and second planetary gear sets PG1 and PG2 operate as the compound planetary gear set by operation of the first clutch C1 and rotation speed of the input shaft IS is input to the fourth rotation shaft TM4, the first rotation shaft TM1 is operated as the fixed element by operation of the first brake B1. Therefore, rotation speed that is the same as the rotation speed of the input shaft IS is output to the second rotation shaft TM2 and increased rotation speed is output to the fifth rotation shaft TM5.

In a state that the third and fourth planetary gear sets PG3 and PG4 operate as the compound planetary gear set by operation of the third clutch C3 and the rotation speed that is the same as the rotation speed of the input shaft IS is input to the second rotation shaft TM2, the increased rotation speed is input to the fifth rotation shaft TM5. Therefore, the ninth forward speed stage is achieved.

The first and second clutches C1 and C2 and the first brake B1 are operated at a tenth forward speed stage 10TH.

In a state that the first and second planetary gear sets PG1 and PG2 operate as the compound planetary gear set by operation of the first clutch C1 and rotation speed of the input shaft IS is input to the fourth rotation shaft TM4, the first rotation shaft TM1 is operated as the fixed element by operation of the first brake B1. Therefore, rotation speed that is the same as the rotation speed of the input shaft IS is output to the second rotation shaft TM2 and increased rotation speed is output to the fifth rotation shaft TM5.

In a state that the third and fourth planetary gear sets PG3 and PG4 operate as the compound planetary gear set by operation of the second clutch C2 and the rotation speed that is the same as the rotation speed of the input shaft IS is input to the second rotation shaft TM2, the increased rotation speed is input to the fifth rotation shaft TM5. The tenth forward speed stage is achieved.

The second and third clutches C2 and C3 and the first brake B1 are operated at an eleventh forward speed stage 11TH.

In a state that rotation speed of the input shaft IS is input to the fourth rotation shaft TM4, the first rotation shaft TM1 is operated as the fixed element by operation of the first brake B1. Therefore, increased rotation speed is output through the fifth rotation shaft TM5.

Since the third and fourth planetary gear sets PG3 and PG4 become direct-coupling states by operation of the second and third clutches C2 and C3, the eleventh forward speed stage where the increased rotation speed input to the fifth rotation shaft TM5 is just output is achieved.

The second clutch C2 and the first and second brakes B1 and B2 are operated at a twelfth forward speed stage 12TH.

In a state that rotation speed of the input shaft IS is input to the fourth rotation shaft TM4, the first rotation shaft TM1 is operated as the fixed element by operation of the first brake B1. Therefore, increased rotation speed is output through the fifth rotation shaft TM5.

In a state that the third and fourth planetary gear sets PG3 and PG4 operate as the compound planetary gear set by operation of the second clutch C2 and the increased rotation speed is input to the fifth rotation shaft TM5, the seventh rotation shaft TM7 is operated as the fixed element by operation of the third brake B3. Therefore, the twelfth forward speed stage is achieved.

The third clutch C3 and the first and third brakes B2 are operated at a reverse speed stage REV.

In a state that rotation speed of the input shaft IS is input to the fourth rotation shaft TM4, the first rotation shaft TM1 is operated as the fixed element by operation of the first brake B1. Therefore, increased rotation speed is output through the fifth rotation shaft TM5.

In a state that the third and fourth planetary gear sets PG3 and PG4 operate as the compound planetary gear set by operation of the third clutch C3 and the increased rotation speed is input to the fifth rotation shaft TM5, the seventh rotation shaft TM7 is operated as the fixed element by operation of the third brake B3. Therefore, inverse rotation speed is output and the reverse speed stage is achieved.

The planetary gear train according to various embodiments of the present invention may achieve twelve forward speed stages and one reverse speed stage by combining four planetary gear sets with six friction elements.

Therefore, power delivery performance and fuel economy may be improved.

Since a speed stage suitable to engine speed can be achieved due to multiple speed stages, silent driving may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
   an input shaft receiving torque of an engine;
   an output shaft outputting changed torque;
   a first planetary gear set including a first sun gear, a first planet carrier, and a first ring gear;
   a second planetary gear set including a second sun gear, a second planet carrier, and a second ring gear;
   a third planetary gear set including a third sun gear, a third planet carrier, and a third ring gear;
   a fourth planetary gear set including a fourth sun gear, a fourth planet carrier, and a fourth ring gear;
   a first rotation shaft including the first and second sun gears and selectively connected to a transmission housing;
   a second rotation shaft including the first planet carrier and the third and fourth ring gears;
   a third rotation shaft including the first ring gear and selectively connected to the transmission housing;
   a fourth rotation shaft including the second planet carrier, directly connected to the input shaft, and selectively connected to the second rotation shaft;
   a fifth rotation shaft including the second ring gear and the third sun gear;
   a sixth rotation shaft including the third planet carrier;
   a seventh rotation shaft including the fourth sun gear and selectively connected to the sixth rotation shaft or the transmission housing; and
   an eighth rotation shaft including the fourth planet carrier, directly connected to the output shaft, and selectively connected to the sixth rotation shaft.

2. The planetary gear train of claim 1, wherein each of the first, second, third, and fourth planetary gear sets is a single pinion planetary gear set.

3. The planetary gear train of claim 1, wherein the first, second, third, and fourth planetary gear sets are disposed sequentially from an engine side.

4. The planetary gear train of claim 1, further comprising:
   a first clutch disposed between the second rotation shaft and the fourth rotation shaft;
   a second clutch disposed between the sixth rotation shaft and the eighth rotation shaft;
   a third clutch disposed between the sixth rotation shaft and the seventh rotation shaft;
   a first brake disposed between the first rotation shaft and the transmission housing;
   a second brake disposed between the third rotation shaft and the transmission housing; and
   a third brake disposed between the seventh rotation shaft and the transmission housing.

5. The planetary gear train of claim 4, wherein a first forward speed stage is achieved by operation of the third clutch and the first and second brakes,
   a second forward speed stage is achieved by operation of the second clutch and the first and second brakes,
   a third forward speed stage is achieved by operation of the second and third clutches and the second brake,
   a fourth forward speed stage is achieved by operation of the second clutch and the second and third brakes,
   a fifth forward speed stage is achieved by operation of the first and second clutches and the second brake,
   a sixth forward speed stage is achieved by operation of the first clutch and the second and third brakes,
   a seventh forward speed stage is achieved by operation of the first and third clutches and the second brake,
   an eighth forward speed stage is achieved by operation of the first, second, and third clutches,
   a ninth forward speed stage is achieved by operation of the first and third clutches and the first brake,
   a tenth forward speed stage is achieved by operation of the first and second clutches and the first brake,
   an eleventh forward speed stage is achieved by operation of the second and third clutches and the first brake,
   a twelfth forward speed stage is achieved by operation of the second clutch and the first and third brakes, and
   a reverse speed stage is achieved by operation of the third clutch and the first and third brakes.

6. A planetary gear train of an automatic transmission for a vehicle, comprising:
   an input shaft receiving torque of an engine;
   an output shaft outputting changed torque;
   a first planetary gear set including a first sun gear, a first planet carrier, and a first ring gear;
   a second planetary gear set including a second sun gear, a second planet carrier, and a second ring gear;
   a third planetary gear set including a third sun gear, a third planet carrier, and a third ring gear; and
   a fourth planetary gear set including a fourth sun gear, a fourth planet carrier, and a fourth ring gear,
   wherein the input shaft is directly connected to the second planet carrier, the output shaft is directly connected to the fourth planet carrier, the first sun gear is directly connected to the second sun gear, the first planet carrier is directly connected to the third ring gear and the fourth ring gear, the second ring gear is directly connected to the third sun gear, the first planet carrier is selectively connected to the second planet carrier, the third planet carrier is selectively connected to the fourth planet carrier, the third planet carrier is selectively connected to the fourth sun gear, the first sun gear and the second sun gear are selectively connected to a transmission housing, the first ring gear is selectively connected to the transmission housing, and the fourth sun gear is selectively connected to the transmission housing.

7. The planetary gear train of claim 6, wherein each of the first, second, third, and fourth planetary gear sets is a single pinion planetary gear set.

8. The planetary gear train of claim 6, wherein the first, second, third, and fourth planetary gear sets are disposed sequentially from an engine side.

9. The planetary gear train of claim 6, further comprising:
a first clutch selectively connecting the first planet carrier to the second planet carrier;
a second clutch selectively connecting the third planet carrier to the fourth planet carrier;
a third clutch selectively connecting the third planet carrier to the fourth sun gear;
a first brake selectively connecting the first sun gear and the second sun gear to the transmission housing;
a second brake selectively connecting the first ring gear to the transmission housing; and
a third brake selectively connecting the fourth sun gear to the transmission housing.

10. The planetary gear train of claim 9, wherein a first forward speed stage is achieved by operation of the third clutch and the first and second brakes,
a second forward speed stage is achieved by operation of the second clutch and the first and second brakes,
a third forward speed stage is achieved by operation of the second and third clutches and the second brake,
a fourth forward speed stage is achieved by operation of the second clutch and the second and third brakes,
a fifth forward speed stage is achieved by operation of the first and second clutches and the second brake,
a sixth forward speed stage is achieved by operation of the first clutch and the second and third brakes,
a seventh forward speed stage is achieved by operation of the first and third clutches and the second brake,
an eighth forward speed stage is achieved by operation of the first, second, and third clutches,
a ninth forward speed stage is achieved by operation of the first and third clutches and the first brake,
a tenth forward speed stage is achieved by operation of the first and second clutches and the first brake,
an eleventh forward speed stage is achieved by operation of the second and third clutches and the first brake,
a twelfth forward speed stage is achieved by operation of the second clutch and the first and third brakes, and
a reverse speed stage is achieved by operation of the third clutch and the first and third brakes.

* * * * *